(No Model.)
J. R. STOREY.
TAILOR'S MEASURE.
No. 537,132. Patented Apr. 9, 1895.
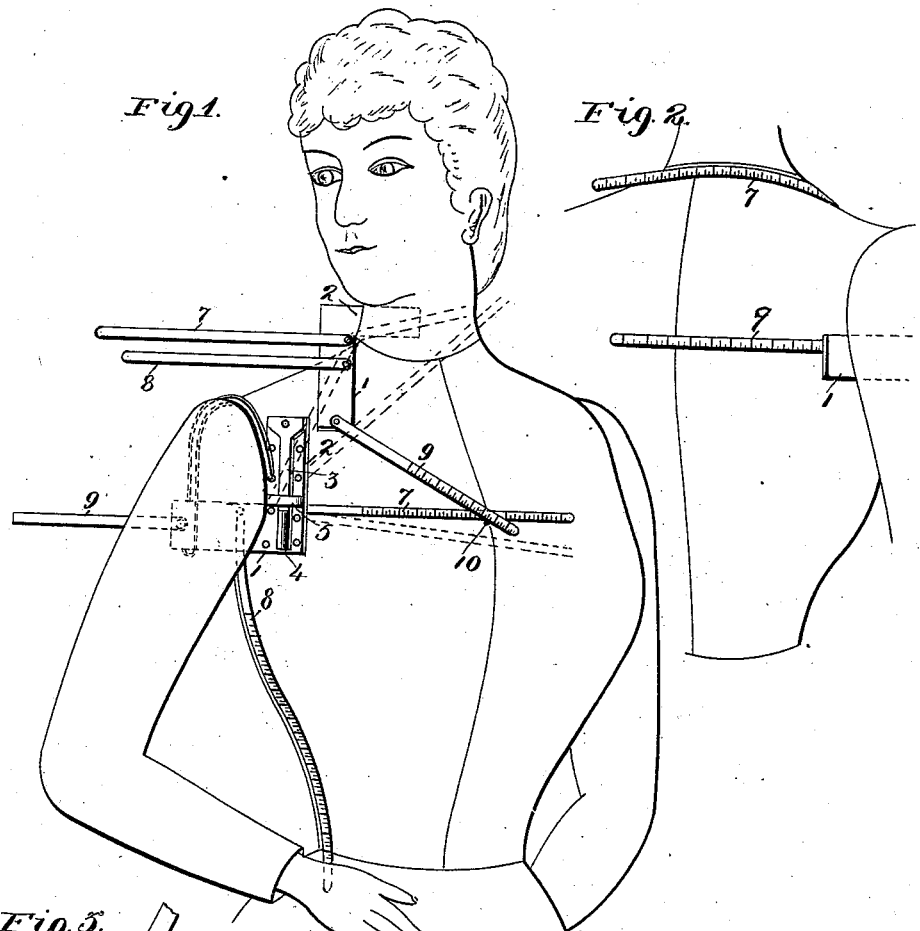
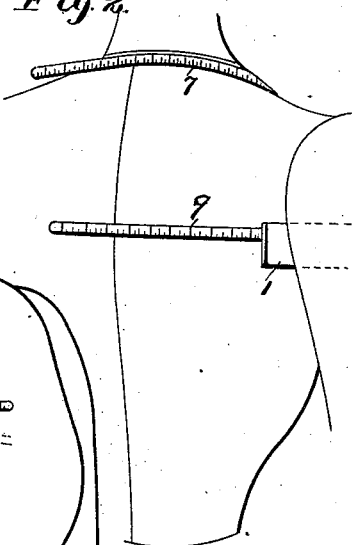
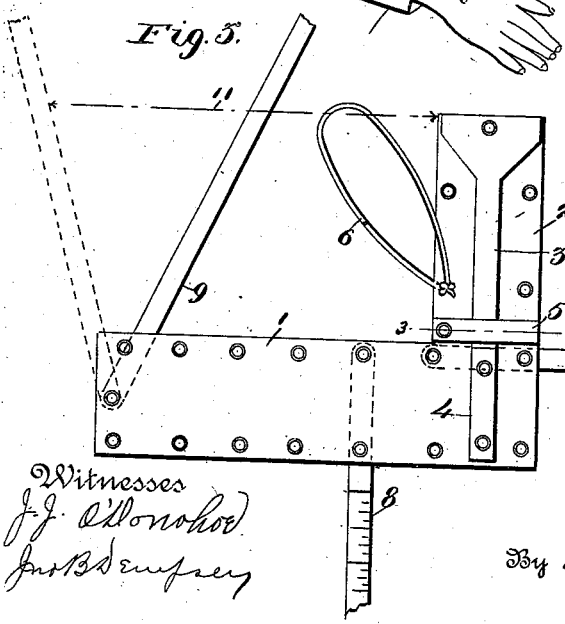
Witnesses
J. J. O'Donohoe
Jno. B. Dempsey
Inventor
James R. Storey.
By his Attorneys
Keller & Starek

UNITED STATES PATENT OFFICE.

JAMES R. STOREY, OF ST. LOUIS, MISSOURI.

TAILOR'S MEASURE.

SPECIFICATION forming part of Letters Patent No. 537,132, dated April 9, 1895.

Application filed May 14, 1894. Serial No. 511,094. (No model.)

*To all whom it may concern:*

Be it known that I, JAMES R. STOREY, of the city of St. Louis, State of Missouri, have invented certain new and useful Improvements in Measuring-Squares, of which the following is a full, clear, and exact description, reference being had to the accompanying drawings, forming a part hereof.

My invention has relation to improvements in measuring squares and consists in the novel arrangement and combination of parts more fully set forth in the specification and pointed out in the claim.

In the drawings, Figure 1 is a perspective view of a bust and head with my improvement applied thereto. Fig. 2 is a rear view. Fig. 3 is a plan view of the square. Fig. 4 is an end view, and Fig. 5 is a section on the line 3—3 of Fig. 3.

The object of my invention is to construct a measuring square which, when properly applied can be used, by the tape lines secured thereto, for the taking of the chest measure, diagonal chest, point, and blade measure by one tape; the under arm measure by a second tape, and the depth measure by a third tape, by depth measure being meant the actual vertical distance from the medial point in the back of the neck to the middle of the base of scye, that is, the line connecting the lowest points of the arm holes.

In detail the invention may be described as follows:

Referring to the drawings, 1 represents the long arm, and 2 the short arm of the square. To the end of the short arm is pivoted a plumb arm 3 having a suitable leaden weight 4, the said plumb arm being confined and guided by a transverse strip 5. When the square is placed in position under the arm of the individual, a rubber loop 6 secured to the short arm is passed over the shoulder of the person and passed over the long arm of the square, so that when the square is once adjusted and made plumb it will remain in position.

On the arm 1 of the square and on the reverse side of that to which the plumb 3 is pivoted, are secured the tape lines 7, 8, and 9, the line 7 being adapted to take the chest, diagonal chest, point and blade measures, and the line 8 being adapted to take the under arm measure as fully indicated in the drawings. The tapes 7 and 8 are secured along the upper edge of the arm 1 and adjacent to the angle formed by the respective arms of the square, the inch marks or other division marks being marked on the same side of each tape, that is, on the outside when the square is held in the position as indicated in Figs. 1, 2, and 3.

To use the tape 9 the square is placed with the inner end of the short arm against the middle of the back of the neck, the long arm 1 passing over the chest and at right angles to a line passing through the shoulders of the body. When in this position, the tape 9 which has its inch or other marks on the reverse side to that of the tapes 7 and 8, is shifted about its pivotal point until a particular mark thereon strikes the middle of the base of scye, that is, the middle of the line joining the lowest point of the arm holes, and indicated by the numeral 10.

All the tapes are made of suitable stiff material, such as paper, steel, aluminum, and the like, and the tape 9 is firmly pivoted to the arm 1 so that it will remain in any position to which it may be shifted; and accordingly when the point 10 on the base of scye is measured off as above indicated, the square is removed and laid on the pattern sheet, and the vertical distance between the end of the short arm of the square and the point on the tape that touches the mark 10 will be the depth measure. This is indicated by the dotted line 11 in Fig. 3, this being one of the most difficult measurements to get at, especially in the case of female busts, the latter presenting marked extremes in bust measurements, and therefore the figuring out of the actual depth measure is always a difficult problem; but with my present improvement any difficulty in this direction is overcome.

It is to be noted that I do not limit myself to the precise details shown in the drawings, nor to the precise materials specified.

In practice while the tapes 7 and 8 are being used, the tape 9 is folded inward along the arm 9 where it will be out of the way for the time being.

Having described my invention, what I claim is—

A measuring square comprising a long and a short arm, a plumb arm pivoted to the short arm, a transverse strip for holding and guiding said plumb arm in position, a loop secured to the square adapted to be passed over the shoulder, tapes secured to the long arm for taking necessary measurements, and a tape secured at the end of the long arm for taking depth measurement, said last named tape adapted to remain in any adjusted position upon removal of the square from the person, substantially as set forth.

In testimony whereof I affix my signature in the presence of two witnesses.

JAMES R. STOREY.

Witnesses:
    JAMES J. O'DONOHOE,
    EMIL STAREK.